United States Patent [19]

Tarantino

[11] 4,167,217
[45] Sep. 11, 1979

[54] HAND RAKE WITH CUTTING EDGE

[76] Inventor: Phillip Tarantino, 6767 Northland Rd., Manteca, Calif. 95336

[21] Appl. No.: 868,391

[22] Filed: Jan. 10, 1978

[51] Int. Cl.² ............................................. A01B 1/20
[52] U.S. Cl. .................................. 172/375; 172/378; 294/51
[58] Field of Search ............... 172/371, 375, 378, 380, 172/381; 56/400.05, 400.07, 400.11, 400.21; D8/6; 294/51, 54

[56] References Cited

U.S. PATENT DOCUMENTS

| 332,350 | 12/1885 | Kretsinger | 172/375 |
| 565,379 | 8/1896 | Dickson | 172/371 |
| 865,150 | 9/1907 | Anderson | 172/371 |
| 891,412 | 6/1908 | Earle | 172/371 |
| 964,453 | 7/1910 | Robarge | 294/54 |
| 1,000,875 | 8/1911 | Adam | 294/54 |
| 1,014,250 | 1/1912 | Norman | 56/400.11 |
| 2,065,830 | 12/1936 | Sherman | 56/400.07 |

FOREIGN PATENT DOCUMENTS 1170185 5/1964 Fed. Rep. of Germany ........... 172/378
260864 11/1926 United Kingdom ..................... 172/371

Primary Examiner—Richard T. Stouffer
Attorney, Agent, or Firm—J. L. Bohan

[57] ABSTRACT

A landscaping hand rake having a handle, tines and an extensive arcuate body containing rectangular perforations across the width of the body. In the inverted position the rake will cause dirt to be scooped into the arcuate cavity due to a cutting edge created by a lip on one of the edges of the rectangular perforations.

2 Claims, 5 Drawing Figures

HAND RAKE WITH CUTTING EDGE

BACKGROUND OF THE INVENTION

The device herein disclosed is directed in general to a hand rake for use in gardening and landscaping activities and is directed in particular to an improvement in rakes having an extensive body component forming a pocket on the underside thereof for the collection of leaves and other debris, thereby adding to the capacity of the rake for picking up debris. The improvement herein comprising providing comparatively large rectangular perforations in said body component to permit, in addition to the raking function, soil bed perforation functions such as rock removal and surface levelling or contouring.

An example of prior art pertaining to a rake having a debris-collecting pocket is U.S. Pat. No. 2,065,830 issued to N. H. Sherman on Dec. 29, 1936. This prior art patent is of particular interest since not only does it disclose the extensive body component with a debris-collecting pocket on the underside, but, in addition, the body has numerous circular perforations therein. However, such perforations are for the express purpose of imparting diminished resistance of the body to flexure. The perforations disclosed are not rectangular and their size and location would not incidentally lend the rake to use for soil preparation functions of the present invention.

A further example of a prior art hand rake is that disclosed in U.S. Pat. No. 1,014,250 issued to S. E. Norman on Jan. 9, 1912. This patent shows a solid shield back in FIG. 9 without perforations and, accordingly, enjoys the added debris collecting feature of the present invention but does not permit of the soil preparation functions thereof.

SUMMARY OF THE INVENTION

The hand rake of the present invention incorporates an arcuate rake head with a body shield portion that forms a pocket on the underside thereof for substantially increasing the capacity of the rake for accumulating and collecting debris. By swinging the rake handle in an arc so that the tines are pointing upward, the debris is caught in said pocket allowing it to be picked up and disposed of in a wheelbarrow or the like.

However, the rake herein disclosed contains a plurality of elongated rectangular perforations in the body of the shield to permit of said soil preparation function without adversely affecting the debris collection and removal function as described above. The long side of the rectangular perforation may be vertically disposed (i.e. in alignment with the axis of the tines and the handle) or horizontally disposed.

The horizontal configuration is particularly suited for rough grading in soil preparation since it permits of sifting out large objects and the movement of a comparatively large mass of dirt from one location to another. The vertical configuration is particularly adapted to finish grading since smaller rocks, roots and other debris can be sifted out and the massive dirt that can be redistributed is correspondingly smaller.

In both configurations the arcuate rake head body forms a cavity on the underside thereof. The arcuate surface extends a predetermined distance, generally, from the back edge of the body to the root of the tines.

DETAILED DESCRIPTION

Figure 1:
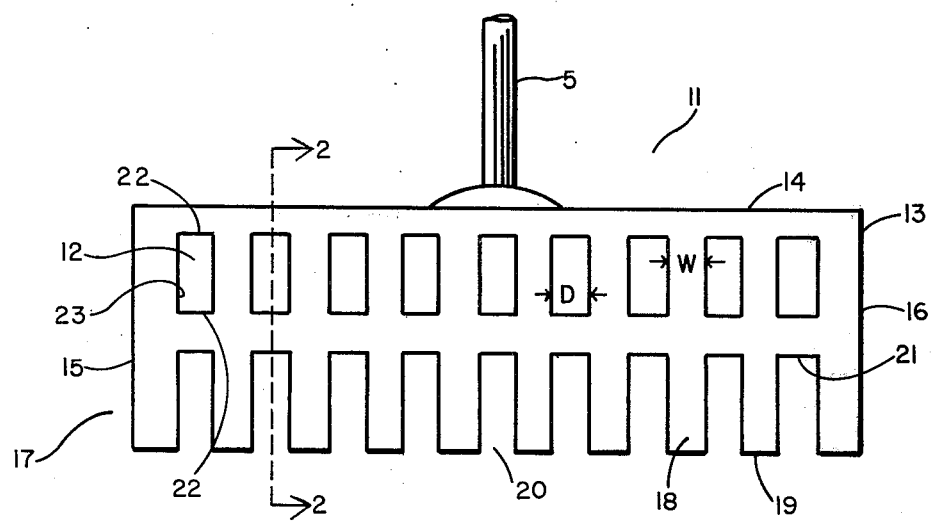
FIG. 1 is a plan view looking rearwardly of the rake of the present invention.

Referring to the figures, there is shown in FIG. 1 the rake 11 of the present invention incorporating rectangular perforations 12 therein in a vertical configuration. The rake body 13 has attached at the rearward edge 14 thereof a handle extending centrally therefrom. The plurality of rectangular perforations 12 extends substantially from one side 15 of the rake to the opposite side 16. At the forward portion 17 of the body 13 are located a series of rake teeth 18. The teeth 18 extend downwardly from the body 13 and, preferably, do not continue the same radius of curvature as body 13. Instead the teeth 18 are substantially straight for their entire length so as to cause edges 19 of the teeth to come into biting contact with the soil. A preferred method for fabricating the body and teeth portion of the rake is to take a sheet material such as aluminum, which is approximately one-quarter of an inch thick, and cut the openings 20 and perforations 12 therein with appropriate cutting means. Alternatively, the perforated head and the teeth portions can be formed by casting. The root portion 21 may be a straight surface as shown in FIG. 1 or may be curved to avoid sharp corners and possible stress cracking. The same is true with regard to the short straight edges 22 of the rectangular perforation 12 and these edges 22 can likewise be curved in form in order to minimize the development of stress risers at the sharp corners. The perforations 12 usually have a width of approximately one and a half to one inch along the short edge and is shown as "D" in FIG. 1. The perforations 12 are usually separated from one another by distance "W" as shown in FIG. 1 which is preferably one-half to two inches. The long edge 23 of the slots or perforations 12 is usually considerably greater than dimension "D" and is preferably in the range of from four to ten inches. As can be more readily seen in FIG. 2 the distance from the root or top 24 of perforation 12 is a predetermined distance "H" from the rearward edge 14 of the body. Similarly, the bottom room or edge 25 of perforation 12 is separated from root 21 of the teeth by a distance "S".

Accordingly, the operator uses the rake of the present invention by grasping handle 5 and placing the leading edge 19 of the teeth on soil 26. The rake will perform the usual functions of a rake by picking up accumulated debris such as leaves, twigs, small stones, paper and other matter. However, due to the arcuate configuration of the body 13, there is formed on the underside thereof a pocket or cavity 27 which allows for a considerable accumulation of the debris being raked before it is necessary for the operator to lift the rake with the debris therein to a suitable disposing device, such as a wheelbarrow, plastic bag or other such device. However, in those circumstances where the operator desires to prepare the soil for planting a lawn, for a garden bed, for construction or for other purposes, he can grasp the rake handle 5 in a normal manner and drag the tines or teeth 18 towards him in a normal manner using a rake. As the operator pulls the rake in this manner, the dirt will accumulate in the cavity area 27 whereupon the operator can then swing the handle 5 forward until the teeth are pointing upwardly, thereby causing the accumulative soil to rest in cavity or pocket 27 by the force of gravity. The soil can then be sifted through perforations 12 by shaking the rake 11 from side to side thereby entraining any large debris such as stones, roots, pieces of wood or concrete, etc. This unwanted debris can then be disposed of in a pail, wheelbarrow or other receptacle. Once the area of soil being prepared has been freed of such debris such as rocks, roots, etc., the rake can then be used to perform a unique levelling function. In order to move dirt from a high point in an area that is to be levelled, the rake 11 is inverted so that the upper side 29 of the rake 11 rests upon the soil surface. By moving the rake in a circular motion, as well as in a forward and side-to-side motion, the ground is caused to be levelled out and and some of the soil can, if desired, be caused to work its way into the cavity 27 through the perforations 12. Dirt will be retained in the spaces "W" between the cavities 12 and, accordingly, the rake can be pulled into an area where dirt is desired and shaken slightly from side to side while being lifted to place the dirt in that area. In this manner the rake 11 can perform a levelling function in an efficient and effective manner.

Figure 2:
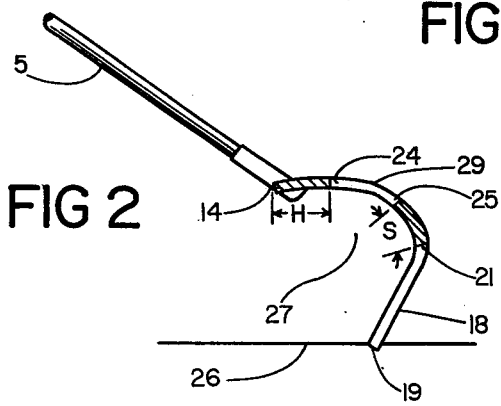
FIG. 2 is a cross-sectional view on lines 2—2 of FIG. 1.
Figure 3:
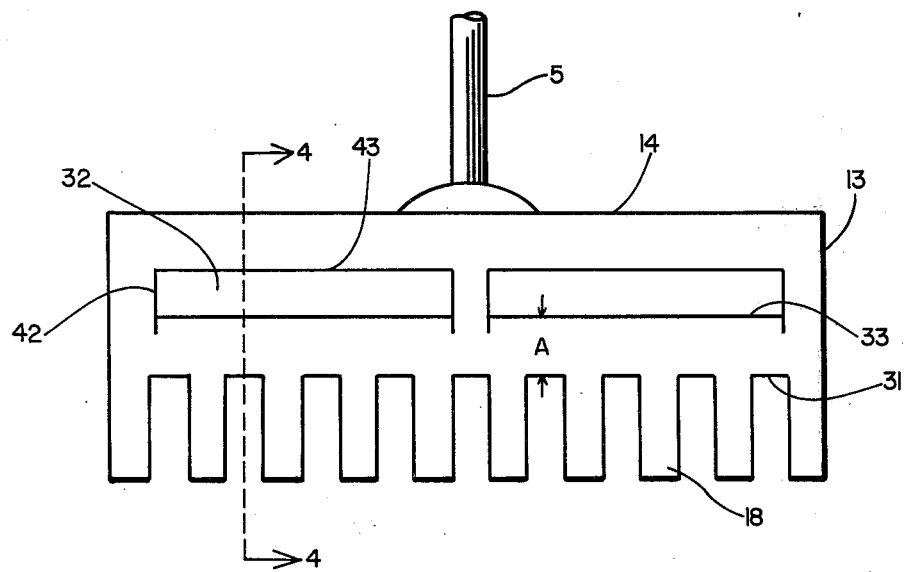
FIG. 3 is a plan view looking rearwardly of another configuration of the rake of the present invention.
Figure 4:
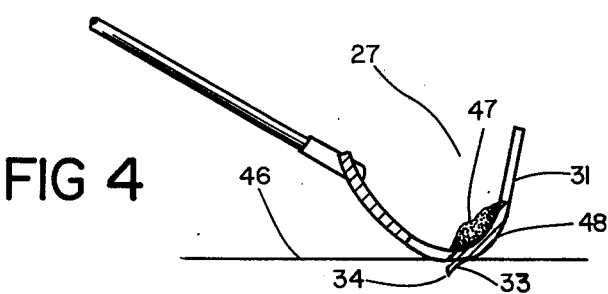
FIG. 4 is a cross-sectional view on lines 4—4 of FIG. 3.

In most instances the vertically aligned perforations as shown in FIGS. 1 and are adequate. However, in those cases where large areas are to be levelled or considerable dirt may necessarily be moved in order to produce a level seed bed for grass or, alternatively, if it is desired to produce a contoured area for a garden bed with a rolling effect, the alternative design depicted in FIGS. 3 and 4 may be used. Referring to FIG. 3, the handle 5 is attached to the rearward edge 14 of the body 13 and teeth 18 are located along the leading edge of the body 13 in the same manner as shown in FIG. 1. However, the perforations 32 are aligned horizontally, that is, substantially perpendicular or normal to the axis of the handle and the normal direction of raking. In this particular embodiment only two perforations are located in body 13, however, it is feasible to employ numbers greater than two in an end-to end fashion. Just as in the configuration shown in FIG. 1, the rake of the design shown in FIG. 3 will perform the normal raking functions of a rake having a cavity 27 to form a debris-accumulating pocket during the normal raking functions, such as raking leaves, twigs, etc. As discussed above such a pocket substantially increases the capacity of the rake for accumulating such debris, and the rake need be lifted fewer times to the wheelbarrow or other disposal means in order to pick up the same quantity of material as would be required with the normal rake. The short edge 42 of the rectangular perforation 32 would generally range from three-quarters of an inch to two inches. The long dimension 43 in the average sized rake will usually measure from four to ten inches, and even larger in rakes having a wider body. In performing the soil preparation function, the rake is first used in its normal position with the tines digging into the dirt so as to loosen the dirt and accumulate in the pocket or cavity 27. By rolling the rake over so that the tines point upwardly, rocks and other debris can be separated from the soil by moving the rake from side to side so that the soil passes through the perforation 32 while the larger debris remains within the cavity 27 for disposal in appropriate means, such as a wheelbarrow. Since the over-all dimensions of the perforation 32, as shown in FIGS. 3 and 4, is greater than the perforation 12 shown in FIGS. 1 and 2, as a rule the configuration, shown in FIG. 3, will be utilized for removing coarser materials from the soil. The distance between the forward edge 33 of perforation 32 the root 31 of the tines is shown as "A". This distance will range from slightly under two inches to over four inches and provides a substantial area for the accumulation of dirt when the rake is drawn by the operator towards himself across the soil 46, as shown in FIG. 4. It is preferable that leading edge 33 does not follow the same curvature of radius as the body 13, but instead is substantially tangential to said radius of curvature at that point. This provides a slight leading or cutting edge 34 creating a lip which will cause the dirt to be readily scooped into rake cavity 27 and accumulates in area 47 between said leading edge 33 and the root 31 of the teeth. This area A has greater holding capacity for dirt than the accumulated areas of W, H and S as depicted in FIGS. 1 and 2 above. Accordingly, more dirt can be stored in the rake of the design of FIGS. 3 and 4 as can be in the design of FIGS. 1 and 2. If an area is desired to be levelled, and a high spot exists, the rake as shown in FIG. 4 can be placed in an inverted position so that upon pulling the rake across the soil, dirt is caused to accumulate in area 47 by virtue of the cutting action of edge 34. The rake handle can then be tilted slightly upwards and the rake moved to a low spot, and then tilted back downward while shaking the rake forward, to cause the soil to fall out of perforation 32 and onto the ground in the low area. By then raising the handle of the rake again, the outer surface of curve portion 48 presents a broad, smooth surface for the purpose of smoothing out the so deposited dirt.

Accordingly, by using the device of the present invention, the rake can first be used in its normal capacity of clearing the area of leaves and other such debris in an efficient manner. The operator then can, by applying additional force on the handle of the rake, cause the teeth to dig into the soil so as to dislodge any foreign material, such as rocks, roots, etc. The area of soil being worked can then be cleared of such rocks and debris by a combination raking, handle roll-over and shaking sequence thereby causng the dirt to be sifted through the perforations in the rake and the debris being held in the cavity of the rake for appropriate disposal. Then when the soil has been cleared of the sub-surface debris, the rake body can be inverted so that the soil can be worked up through the perforations and transported from an area where soil is not desired to an area where soil is desired and then deposited in that area by appropriate movement or shaking of the rake. Once the desired levelling or contouring has been substantially achieved, the rake can then be used to produce a smooth surface by pushing the rake across the surface with the handle in a slightly raised position so as to present a smooth portion of its curved contour to the soil.

The materials of construction can vary widely from wooden, plastic to metallic materials. It is generally preferable to make the body out of a metallic material such as aluminum or steel, and it can be either formed from sheet stock, forged or cast. The handle can be made as an integral part of the rake being welded or cast in place or can be affixed thereto in a detachable manner. Although the perforations have been shown primarily as rectangular in shape as indicated above, the ends thereof 22 and 42 may be curved or non-linear.

Figure 5:
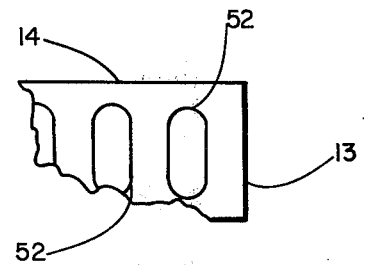
FIG. 5 is a cutaway plan view of the rectangular perforations showing an alternative design.

As shown in FIG. 5 the short side of the rectangular perforations can be provided with a half-round configuration 52.

As used herein, the term "transverse axis of the rake head body" means an axis running the width of the body from edge 16 to edge 15 in a horizontal manner, as shown in FIG. 1; in other words, perpendicular to the axis of the handle.

It is obvious that numerous variations may be made without departing from the concept disclosed herein of the present invention. Although there have been shown and described the particular embodiments of this invention, it will be obvious to those skilled in the art that various changes and modifications may be made therein without departing from the invention.

I claim:

1. In a hand rake having an arcuate rake head body forming a cavity on the underside thereof having a forward edge, a rearward edge, and a transverse axis substantially parallel with said forward edge, a handle normally and centrally affixed to said rearward edge and a plurality of distending teeth affixed to said forward edge comprising providing said arcuate rake head body with a plurality of elongated rectangular perforations between said forward and rearward edges and separated from said forward edge by a sufficient amount to provide an unperforated area for the collection of dirt particles, the long axis of said rectangular perforations being substantially parallel to said transverse axis of said rake head body thereby forming a rearward long side and a forward long side sunbstantially parallel to said transverse axis, said arcuate body continuing in an arcuate manner from said forward long side for a substantial portion of the distance to said forward edge, said distending teeth being in such an angular relation to the handle that when the handle is in its ordinary raking position the teeth will form an obtuse angle with the ground under the cavity, said forward long side of said rectangular perforation forming a lip which extends outwardly from and substantially tangential to the outside surface of said arcuate body for a sufficient distance to create a cutting edge when the rake is used in the inverted position.

2. In a hand rake as in claim 1 wherein the number of rectangular perforations is two.

* * * * *